UNITED STATES PATENT OFFICE.

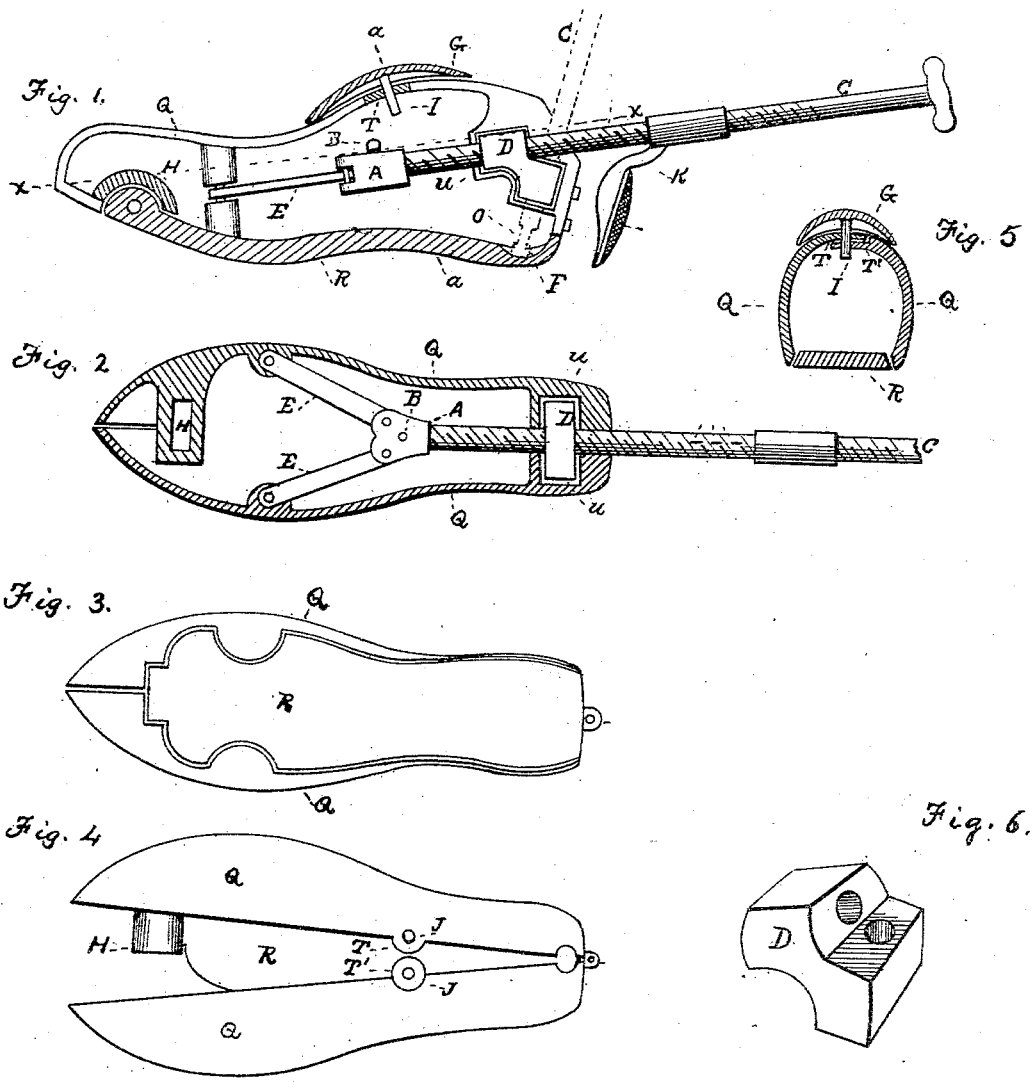

WILEY JONES, OF NORFOLK, VIRGINIA.

BOOT AND SHOE STRETCHER.

SPECIFICATION forming part of Letters Patent No. 321,610, dated July 7, 1885.

Application filed April 29, 1885. (No model.)

*To all whom it may concern:*

Be it known that I, WILEY JONES, a citizen of the United States, residing at Norfolk, in the county of Norfolk and State of Virginia, have invented a new and useful Improvement in Boot and Shoe Stretchers, of which the following is a specification.

This invention has reference to shoe-stretchers, and its object is the production of an implement capable of stretching a boot or shoe in various directions—namely, across the toe and at the instep.

The leading features in the construction of my invention consist of a compound nut screw-tapped both horizontally and vertically, and a divided metallic last hollowed out and connected at the heel by means of a hinge.

In the drawings, which serve to illustrate my invention more fully, and form a part of this specification, Figure 1 is a longitudinal elevation, partly in section, showing the inner side of one-half of the last with central section of the instep-cap, of the socket, and of the bottom plate. Fig. 2 is a horizontal section in the line $x\ x$ of Fig. 1. Fig. 3 is an outside view of the bottom of the last. Fig. 4 is an outside view of the top of the last, and showing a part of the bottom plate. Fig. 5 is a transverse section in the line $a\ a$ of Fig. 1. Fig. 6 is a perspective view of the compound nut.

Similar letters refer to similar parts throughout the several views.

A, in the said drawings, is a swivel-nut, provided with a thumb-screw, B, which fits into a slot or annular groove, O, at the end of screw C, holding the said screw in nut A.

In my former application for Letters Patent for an improvement in boot and shoe stretchers, filed April 22, 1885, Serial No. 163,035, I have described and claimed a divided wooden last having a swivel-nut provided with a thumb-screw, which thumb-screw fits into an annular groove on the end of the screw-rod, the said rod carrying a heel-brace provided with screw-threaded sleeve, and with a convex back, and an adjustable toe-piece with orifice therein; but in the present application, the last being entirely of metal, and provided with the bottom plate, R, and compound nut D, constructed and arranged with devices as hereinbefore described, will admit the shoe to be stretched on the instep as well as across the toe; whereas, in my former application the construction allowed the shoe to be stretched only across the toe and lengthwise. Thus it will be obvious that the devices used in my former application are advantageously combined with my present improvement for more effectually stretching boots and shoes.

D is the compound nut, screw-tapped horizontally to receive screw C in widening the shoe, and tapped vertically to receive the same screw in stretching the instep. Nut D has its bearings in recesses or pockets $u$, one in each side of the last Q Q, as shown in Figs. 1 and 2.

To stretch a shoe across the toe or balls, I turn screw C, thereby driving forward the nut A, which, by means of links E E, expands the last.

To stretch a shoe on the instep, I withdraw screw C from its horizontal position in nut D, and having keyed the instep-cap G on the last, I insert screw C into the vertical aperture of nut D, and turn the screw until its point rests in cavity F of the bottom plate, R, as shown by dotted lines in Fig. 1. Then by continuing to turn screw C, the last Q Q is raised from the bottom plate at the heel, while this bottom plate turns on its pivot in socket H. While the last is being raised in this manner, its two sides are held closely together by the pin I, keying through the apertures J J in the overlapping flanges T and T', Figs. 1, 4, and 5.

Having thus described my invention, what I claim and desire to secure by Letters Patent, is—

1. The combination, in a shoe-stretcher comprising a divided last expanded by an operating-screw, of the compound nut D, tapped to receive the said screw both horizontally and vertically, as shown and described.

2. The combination, in a shoe-stretcher comprising a divided last with overlapping portions T T', and the instep-cap G, of apertures J J, provided with a pin, I, and recesses or pockets $u$, containing a compound nut, D, as and for the purposes described.

3. The combination, in a shoe-stretcher comprising a divided last hinged at the heel, of a bottom plate, R, provided with cavity F, and a single arm pivoted in socket H, substantially as and for the purposes described.

4. In a shoe-stretcher, the parts Q Q, provided with flanges T and T', socket H, and recesses or pockets $u$, in combination with links E E, provided with swivel-nut A, compound nut D, provided with screw C, and bottom plate, R, provided with cavity F, all substantially as and for the purposes described.

In testimony of which I hereunto set my hand this 28th day of April, in the year of our Lord 1885.

WILEY JONES.

Witnesses:
WESTWOOD A. TODD,
RICHARD H. BAKER, Jr.